United States Patent [19]

Ando et al.

[11] Patent Number: 4,725,102
[45] Date of Patent: Feb. 16, 1988

[54] ANTI-SKID DEVICE

[75] Inventors: Hiromi Ando, Tokyo; Yasuo Karasudani, Kanagawa; Tetsuro Nakajo, Chiba, all of Japan

[73] Assignee: Tokico Ltd., Kanagawa, Japan

[21] Appl. No.: 847,779

[22] Filed: Apr. 3, 1986

[30] Foreign Application Priority Data

Apr. 5, 1985 [JP] Japan ............................. 60-50750[U]

[51] Int. Cl.⁴ ................................................ B60T 8/00
[52] U.S. Cl. ............................. 303/24 R; 188/181 A; 303/100
[58] Field of Search ............ 303/100, 93, 24 A, 24 R; 188/181 A, 181 R; 192/3 H

[56] References Cited

U.S. PATENT DOCUMENTS

| | | | |
|---|---|---|---|
| 3,752,251 | 8/1973 | Gaeke | 180/104 |
| 4,353,440 | 10/1982 | Farr | 188/181 A |
| 4,553,651 | 11/1985 | Gaiser et al. | 192/3 H X |
| 4,610,483 | 9/1986 | Matsumoto et al. | 303/100 X |

FOREIGN PATENT DOCUMENTS

| | | |
|---|---|---|
| 54-50763 | 4/1979 | Japan . |
| 55-36186 | 3/1980 | Japan . |
| 55-36187 | 3/1980 | Japan . |
| 2029914 | 3/1980 | United Kingdom . |

Primary Examiner—Duane A. Reger
Assistant Examiner—Matthew C. Graham
Attorney, Agent, or Firm—Wenderoth, Lind & Ponack

[57] ABSTRACT

An anti-skid device for use in a vehicle braking system and comprising a master cylinder for generating pressurized fluid in response to the actuation of a brake pedal, a reservoir supplying hydraulic fluid to the master cylinder, a deceleration detector for detecting the deceleration of a vehicle body the speed of which having been decreased in response to the actuation of the brake pedal, a first valve device for transmitting the fluid pressure generated in the master cylinder to a wheel brake cylinder in actuating the brake pedal and for intercepting the communication between the wheel cylinder and the master cylinder when the deceleration detector detects a predetermined amount of deceleration. The first valve device includes an expansion chamber normally filled by a predetermined amount of pressurized fluid, a dump valve communicating the expansion chamber with the reservoir when the deceleration detector detects the deceleration, and a pump device for pressurizing the expansion chamber. A second valve device is interposed between the first valve device and the reservoir and include a sensor for sensing the inclination of the vehicle such that when the vehicle is at a predetermined up-hill condition the second valve device closes to intercept the communication between the expansion chamber of the first valve device and the reservoir.

2 Claims, 4 Drawing Figures

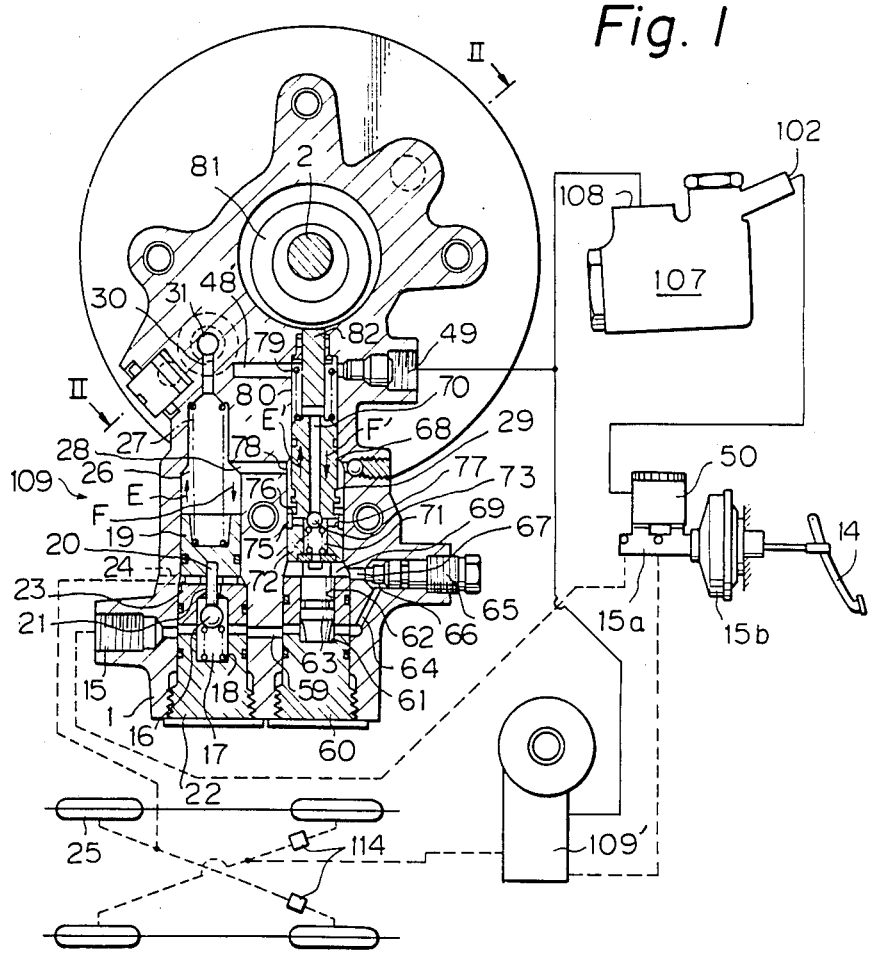
Fig. 1
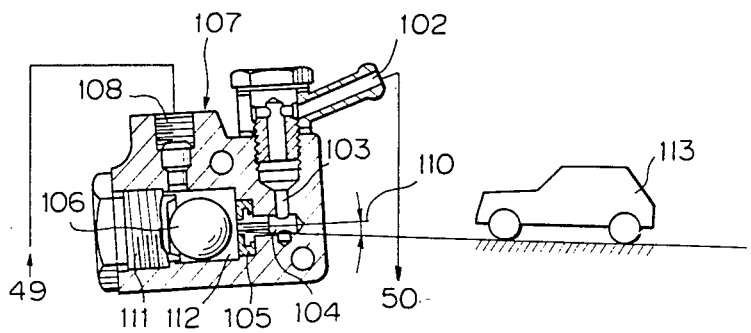

ANTI-SKID DEVICE

BACKGROUND OF THE INVENTION

This invention relates to an anti-skid device for use in a vehicle hydraulic braking system.

Various proposals have been made with respect to the anti-skid device as shown, e.g., in Japanese Patent Disclosures (Kokai) Nos. 54-50763, 55-36186 and 55-36187, in which the deceleration acting on a braked wheel is detected from the relative movement between an inertia member rotatably mounted on the wheel and the wheel, and when the deceleration exceeds a predetermined level a valve is actuated to intercept the supply of pressurized fluid to the brake cylinder of the wheel to reduce the hydraulic pressure in the brake cylinder, whereby rotation of the wheel is permitted and skidding can effectively be prevented.

Such a device acts satisfactorily under down-hill or level road conditions; however, when the vehicle has been stopped up-hill by applying the brakes and, thereafter, the vehicle again is accelerated, the front wheels may slip because the loading on the front wheels is decreased owing to the inclination of the vehicle, and it is necessary to apply the brakes for preventing rearward movement of the vehicle. The resulting relative rotation between the inertia member and the reversely rotating wheel may sometimes actuate the valve to intercept the supply of pressurized fluid to the brake cylinders of the front wheels, particularly when the front wheels are the drive wheels and the rear wheels are driven wheels.

SUMMARY OF THE INVENTION

The present invention has been made in view of the aforesaid problem and aims to provide an anti-skid device which deactivates the anti-skidding function when the vehicle is under up-hill conditions of a predetermined inclination and under standstill or low speed conditions. According to the invention there is provided an anti-skid device for use in a vehicle braking system comprising a pressurized fluid generating device for generating pressurized fluid in response to the actuation of a brake pedal, a reservoir supplying hydraulic fluid to the pressurized fluid generating device, a deceleration detector for detecting the deceleration of a vehicle body with the speed thereof having been decreased in response to the actuation of the brake pedal, a first valve device for transmitting the fluid pressure generated in the pressurized fluid generating device to a wheel brake cylinder the actuating the brake pedal. The first valve device is also for intercepting the communication between the wheel cylinder and the pressurized fluid generating device when the deceleration detector detects a predetermined amount of deceleration. A second valve device is interposed between the first valve device and the reservoir and includes a sensor for sensing the inclination of the vehicle such that when the vehicle is under a predetermined up-hill condition the second valve closes and intercepts the communication between the first valve and the reservoir.

BRIEF DESCRIPTION OF THE DRAWINGS

The invention will hereinafter be explained in detail with respect to a preferred embodiment exemplified in accompanying drawings, in which:

FIG. 1 is a schematic view of an embodiment according to the invention;

DETAILED DESCRIPTION OF THE PREFERRED EMBODIMENT

Figure 2:
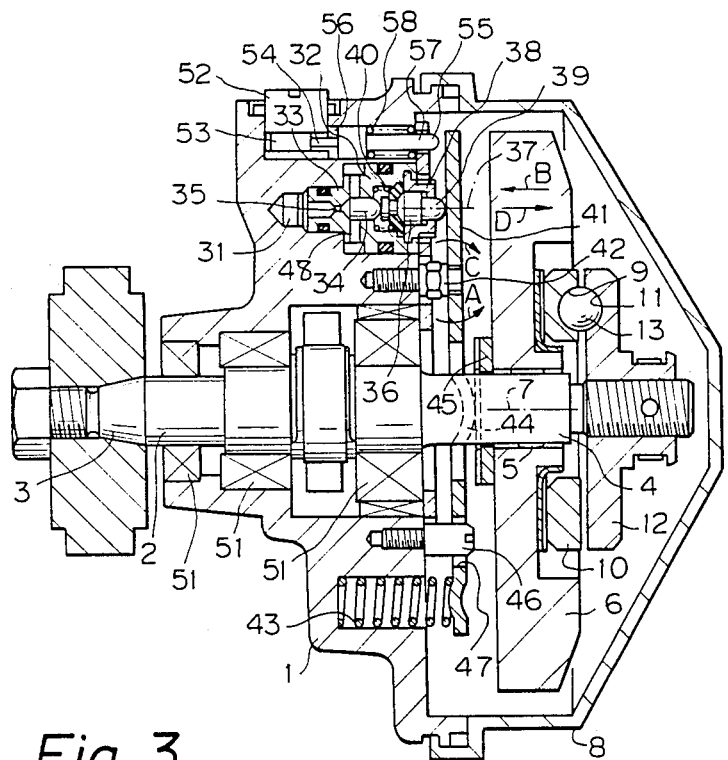
FIG. 2 is a sectional view taken along line II—II in FIG. 1.

In FIG. 2, a shaft 2 rotatably extends through a housing 1 of a first valve device according to the invention, and one end 3 thereof is drivingly connected to a wheel (not shown) of a vehicle. A fly wheel 6 is rotatably and axially slidably mounted on the other end 4 of the shaft 2 through a bearing 5. The fly wheel 6 constitutes an inertia member according to the invention and can rotate around the axis 7 of the shaft 2 and displaces in arrows B and D directions. A cover 8 is mounted on the housing 1. An annular retaining member 10 having one or more ball receiving recesses 9 is mounted on the fly wheel 6 to rotate therewith, and an annular retaining member 12 having one or more ball receiving recesses 11 is mounted on the end 4 of the shaft 2 to rotate therewith. One or more balls 13 are respectively located between opposing ball receiving recesses 9 and 11. The fly wheel 6, the retaining members 10 and 12, and the ball 13 constitute a deceleration detector according to the invention. It will be understood that either one or both of the ball receiving recesses may define a circumferentially extended and sloped configuration.

In FIG. 1, an inlet port 15 formed in the housing 1 of a first valve device 109 according to the invention is connected to a master cylinder 15a which is actuated by a brake pedal 14 through a pneumatic booster 15b. The pneumatic booster 15b and the master cylinder 15a are of conventional type and the detailed construction thereof is omitted. The master cylinder 15a is of a tandem type and a reservoir 50 supplies hydraulic fluid to the master cylinder. The brake pedal 14, the pneumatic booster 15b and the master cylinder 15a constitute a pressurized fluid generating device according to the invention.

The inlet port 15 is communicated with a chamber 17 in which a ball 16 is disposed. The ball 16 biased by a spring 18 is normally displaced downward (as viewed in FIG. 1) by a rod 20 which is mounted on and extending downward from a piston 19, whereby the ball 16 is spaced from a corresponding valve seat, and the chamber 17 is communicated with a chamber 23 through an opening 21 through which the rod 20 extends. The chamber 23 is defined between the piston 19 and a cap member 22 in which the chamber 17 is formed. The chamber 23 is communicated with a brake cylinder (not shown) of the front right wheel 25 through an outlet port 24. And the pressurized fluid supplied to the front right wheel is also supplied to the brake cylinder of rear left wheel through a proportioning valve 114. Further, in the embodiment of FIG. 1, the master cylinder 15a is also connected with brake cylinders of front left wheel and rear right wheels through a valve device 109' having the construction similar to the first valve device 109 and another proportioning valve 114, thereby constituting a so-called X connection.

The piston 19 is slidably fitted in an expansion chamber 26 and is biased downward by a spring 27, and the chamber 26 is communicated through a passage 28 with a pump chamber 29 which is also defined in the housing 1. Further, the chamber 26 is connected through a passage 30 with one end (the left end in FIG. 2) of a valve chamber 31. As shown in FIG. 2, a valve body 32 is fitted in the chamber 31, and the valve body 2 receives therein a valve member 34 cooperating with a valve seat 33 for opening/closing a passage 35 in the valve body 32. A control member 36 controls the valve member 34. The control member 36 is slidable along an axis 37 and is retained in a retaining member 38, and one end 39 of the control member 36 projects out of the housing 1. The control member 36 is biased rightwards in FIG. 2 by a spring 40. The end 39 of the control member 36 normally abuts with a lever 41 which is rockingly mounted on a supporting member 42. A spring 43 is fitted between the lever 41 and the housing 1 to bias the lever 41 to rotate in arrow A direction around the supporting member 42 which acts as a fulcrum. A bent or rightwardly projecting portion 44 is formed on the lever 41, and a collar or washer 45 is disposed between the bent portion 44 and the fly wheel 6. A bolt 46 is mounted on the housing 1 and extends through an opening 47 formed in the lever 41 to prevent the rotation of the lever 41 around the axis 7.

A passage 48 formed in the valve body 32 is communicated with the reservoir 50 through a passage 48' (FIG. 1) and a port 49 (FIG. 1). Shown at 51 in FIG. 2 are bearings.

An adjusting member 52 is screw-threadingly mounted on the housing 1 as shown in FIG. 2 and has a tool receiving recess in the outer end surface thereof. An eccentric cam 53 is integrally mounted on the adjusting member 52 to cooperate with a rod 57. The rod 57 is slidably mounted in a chamber 56 in the housing 1 and, one end 55 of the rod 57 projects from the housing 1. The rod 57 is biassed against the eccentric cam 53 by a spring 58. By rotating the adjusting member 52 it is possible to adjust the projecting amount of the end 55 of the rod 57; further, it is possible to reduce the force acting on the valve member 34 at the valve closed condition.

In FIG. 1, the chamber 17 in the cap member 22 in the housing 1 is communicated with a chamber 61 in a cap member 60 through a passage 59, and a plunger 63 is slidably fitted in a bore 62 in the cap member 60. The chamber 61 is defined by the bore 62 and the plunger 63 and, is communicated through a passage 64 with a chamber 66 in which an air bleed valve 65 is provided. The air bleed valve 65 normally intercepts the communication between the passages 67 and the chamber 66.

Figure 3:
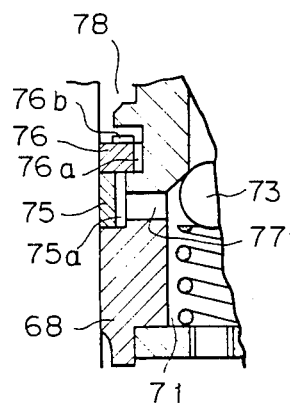
FIG. 3 is an enlarged view of a part of FIG. 1.

The plunger 63 normally abuts with a large diameter lower end of a stepped piston 68 which is received in correspondingly shaped coaxial bore in the housing 1. A stepped bore consisting of a small diameter bore portion 70 and a large diameter bore portion 71 is formed in the piston 68, and the bore portion 71 is permanently communicated with the chamber 69. A ball 73 is disposed in the large diameter bore portion 71 and is biassed by a spring 72 to prevent the flow of liquid from the large diameter portion 71 to the small diameter bore portion 70 and to permit the flow in the opposite direction. As shown in FIG. 3, a piston ring 75 having one or more axially extending grooves 75a in the inner circumference and a piston ring 76 having one or more axial grooves 76a in the inner circumference and one or more axial projections 76b on the upper end surface are fitted in the outer circumference of the large diameter portion of the piston 68. When the ring 76 takes its lowermost position in the ring receiving groove in the piston 68 as shown in FIG. 3, the communication between the chamber 71 and an annular chamber 78 defined between the outer circumference of the piston 68 and the cylindrical wall slidably receiving therein the piston 68 is prevented. As shown in FIG. 1, the chamber 78 is communicated always with the expansion chamber 26 through a passage 28. When the piston ring 76 displaces upward in the ring receiving groove, the chamber 71, which is always communicated with the chamber 69, is communicated with the chamber 26 through a radial hole 77 in the piston 68, the groove 75a in the ring 75, the groove 76a, the spacing between adjacent projections 76b, the chamber 68 and the passage 28. It will be understood that the rings 75 and 76 constitute a check valve mechanism.

The piston 68 is normally biassed downward by or in the direction of arrow F' in FIG. 1 by a relatively weak spring 79. An eccentric cam 81 is mounted on the shaft 2 and a reduced diameter rod portion 82 of the piston 68 extends through the upper end of a stepped bore 80 and faces the outer circumference of the cam 81. In the normal brake applying condition, the pressure supplied to the inlet port 15 is transmitted to the outlet port 24 through the opening 21, and the chamber 23. The pressure in the chamber 23 acts to press upward by piston 19, but the hydraulic liquid confined in the chamber 26 prevents the movement of pistons 19 and 68. (The piston rings 75 and 76 are in the closed condition.)

The ball 16 and the piston 19 having the rod 20, the piston rings 75 and 76, and the valve member 34 constitute the first valve device according to the invention, the operation of which will be described hereinafter.

A valve device 107, constituting a second valve device according to the invention, is disposed between the port 49 of the first valve device 109 and the reservoir 50. The port 49 is connected to a port 108, and the port 108 is communicated with a chamber 112 receiving therein a ball member 106. The chamber 112 is communicated with the reservoir 50 through passages 104 and 103 and a port 102. The valve 107 has a forwardly downwardly inclined longitudinal axis 110 as shown in FIG. 1. When the vehicle 113 is on a level road, the ball member 106 is spaced from a valve seat 105 and the port 108 is communicated with the port 102. When the vehicle is at an up-hill condition with the inclination larger than the mounting angle of the valve 107, the ball member 106 engages with the valve seat 105.

Figure 4:
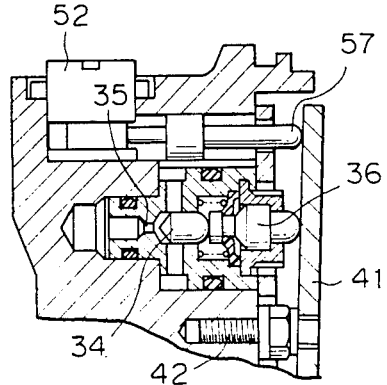
FIG. 4 is a schematic view similar to a part of FIG. 2 but showing an actuated condition.

In operation, when the brake pedal 14 is depressed and pressurized fluid is supplied from the master cylinder 15a to the port 15, the pressure is transmitted to the brake cylinder of the front right wheel through the chamber 17, and to brake cylinder of rear left wheel through the proportioning valve 114. The brake cylinders of the front left wheel and the rear right wheels are also actuated through the valve device 109'. The pressure in the chambers 26, 69, 71 and 78 also rises and nearly equals the pressure in the chamber 17 and the ports in the valve device 109 takes the position shown in FIG. 1. The braking force generated in the wheel brake cylinders generates a deceleration on the rotation of the braked wheels. When the deceleration exceeds a predetermined amount, the rotation of the shaft 2 decreases relative to the fly wheel 6 and the ball 13 acts to displace the fly wheel 6 in arrow B direction in FIG. 2. The projecting portion 44 of the lever 41 is pushed in the same direction, and the lever 41 rotates around the fulcrum 42 (supporting member) in arrow C direction. The control member 36 is displaced by the spring 40 in arrow D direction, and the valve member 34 opens the passage 35, as shown in FIG. 4. It will be noted that, in FIG. 4, the adjusting member 52 is actuated to project the rod 57 to open the valve member 34; however, in the normal operating condition the projecting amount of the rod 57 is adjusted such that the rod 57 engages with the lever 41 during the closing condition of the valve member 34.

The pressurized fluid in chamber 26 is communicated with the reservoir 50 through passages 30, 35, 48 and 48', the port 49, and the second valve device 107. The piston 19 displaces in arrow E the direction of arrow E in FIG. 1 owing to the pressure decrease in the chamber 26, and the ball 16 closes the opening 21. The communication between port 15 and the port 24 is intercepted. The piston 19 further moves in the direction of arrow E because of the pressure in the chamber 23, thus, the pressure in the wheel brake cylinder decreases and the braking force is further reduced. At the same time, the pressure in chambers 78, 71 and 69 also decreases, and the plunger 63 acts to displace the piston 68 in the direction of arrow E' until the upper end 82 of the piston 68 engages with the eccentric cam 81. The piston 68 is reciprocatingly moved by the cam 81 in the directions of E' and F'. During the movement of piston 68 in the E' direction, the rings 75 and 76 (FIG. 3) cooperate to prevent liquid flow from the chamber 78 to the chamber 71 and the ball 73 permits the liquid flow from the bore 70 to the chamber 71; and, during the movement of the piston 68 in the F' direction, the rings 75 and 76 permit liquid flow from chamber 71 to the chamber 78 and the ball 73 prevents liquid flow from chamber 71 to the bore 70. Thus, the piston 68 acts as a pump pumping the liquid in the reservoir 50 to the chamber 26.

The rotational speed of the wheels 25 increases, by reducing the braking force, to nearly the rotational speed of the fly wheel 6; then, the fly wheel 6 moves in the D direction and the lever 41 rotates in the A direction. The valve member 34 closes the passage 35 thereby intercepting the communication between the chamber 26 and the reservoir 50. The pressure in the chamber 26 elevates rapidly owing to the pumping function of the piston 68, and the piston 19 displaced in the F direction thereby decreasing the volume in the chamber 23; thus, the pressure in the wheel brake cylinders is restored rapidly, and the braking force increases rapidly. When the pressure in chambers 26, 78, 71 and 69 elevates to that of the normal condition, the plunger 63 returns to the position shown in FIG. 1, the rod 57 and portion 82 separates from the eccentric cam 81, and the pumping action of the piston 68 terminates.

The aforesaid release and re-application of the braking force are repeated several times until the vehicle is stopped, particularly when the frictional resistance between the braked wheel and the road is relatively small.

The operation of the second valve device 107 will now be explained. The valve device 107 is mounted on the vehicle with a predetermined forwardly and downwardly inclined mounting angle such that when the vehicle is on a level road the ball member does not engage the valve seat 105 thereby permitting free communication between ports 108 and 102. However, given that the vehicle is under an up-hill condition with the slope thereof being larger than the mounting angle, and the driver of the vehicle intends to start the vehicle (that the front wheels are drive wheels and that the frictional resistance between the front wheels and the road is low and slippage of the front wheels has occurred) the driver may depress the brake pedal for preventing rearward movement of the vehicle. The rotor 12 connected to the front wheel stops because of applying the braking force, while the inertia wheel 6 continues to rotate. The condition is similar to that in which excessive deceleration is experienced on the braked vehicle. Thus, the anti-skidding device or the first valve 109 would be actuated to open the valve 34. The braking force is released and, because shaft 2 does not rotate the pumping function is not performed and the hydraulic pressure in the chamber 26 cannot be restored. The second valve device 107 can effectively solve aforesaid problem. The ball member 106 engages with the seat 105 when the vehicle is under the up-hill condition with the slope thereof being larger than the mounting angle, thereby intercepting the communication between ports 108 and 102 or the port 49 and the reservoir 50. Thus, even the valve 34 would open the passage 35, the liquid in the chamber 26 is substantially maintained in the chamber 26, and the piston 19 does not move to close the opening 21 between chambers 17 and 23.

As described heretofore, according to the invention, it is possible to prevent the actuation of the anti-skidding device or the first valve when the vehicle is stopped under the up-hill condition, the gas pedal is applied for re-accelerating the vehicle and the brake pedal is depressed for preventing rearward movement of the vehicle because of slippage of the wheels, whereby the vehicle can be stopped safely.

What is claimed is:

1. An anti-skid device for use in a vehicle braking system and comprising a pressurized fluid generating device for generating pressurized fluid in response to the actuation of a brake pedal, a reservoir supplying hydraulic fluid to the pressurized fluid generating device, a deceleration detector for detecting the deceleration of a braked wheel as the speed thereof is being decreased in response to the actuation of the brake pedal, a first valve device for transmitting the fluid pressure generated in the pressurized fluid generating device to a wheel brake cylinder when the brake pedal is actuated, and for intercepting the communication between the wheel brake cylinder and the pressurized fluid generating device when the deceleration detector detects a predetermined amount of deceleration, and a second valve device including sensing means for sensing an inclination of the vehicle greater than or equal to a predetermined inclination, said second valve device being associated with said first valve device, and operative solely upon detection of the inclination, for preventing the first valve device from intercepting the communication between the wheel brake cylinder and the pressurized fluid generating device, whereby when said sensing means detects the inclination greater than or equal to the predetermined inclination of the vehicle the second valve device acts to prevent the first valve device from intercepting the communication between the wheel brake cylinder and the pressurized fluid generating device.

2. An anti-skid device according to claim 1, wherein the first valve device includes a piston with one side facing a first chamber which permanently communicates with the wheel brake cylinder and to which the fluid pressure generated in the pressurized fluid generating device is transmitted and the other side of said piston facing a second chamber of confined volume, said piston having piston-actuated valve means which connects and intercepts the communication between the first chamber and the pressurized fluid generating device, and a dump valve being actuated by said deceleration detector to communicate the second chamber with the reservoir through said second valve device, whereby said valve means intercepts the communication between the pressurized fluid generating device and the first chamber.

* * * * *